Sept. 10, 1963  G. A. BENNETT  3,103,077
SNOW REMOVER
Filed Nov. 3, 1961  3 Sheets-Sheet 1
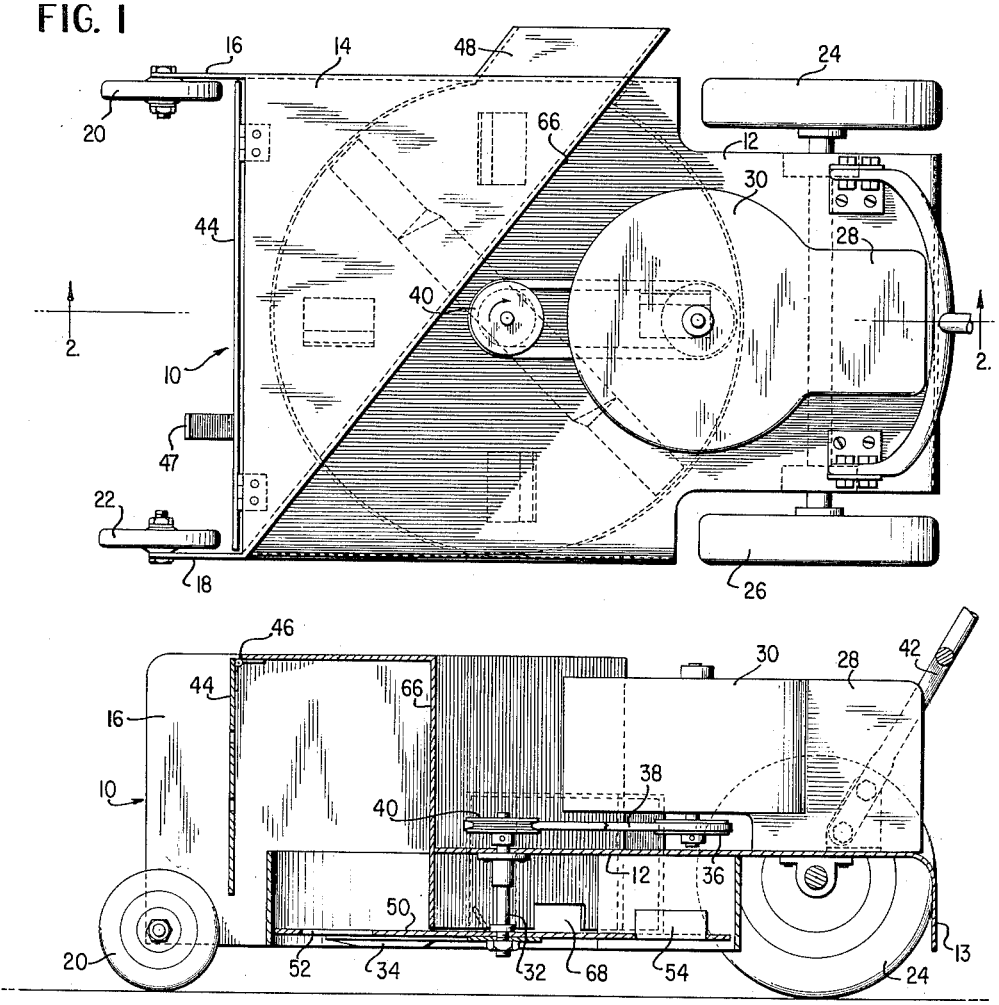
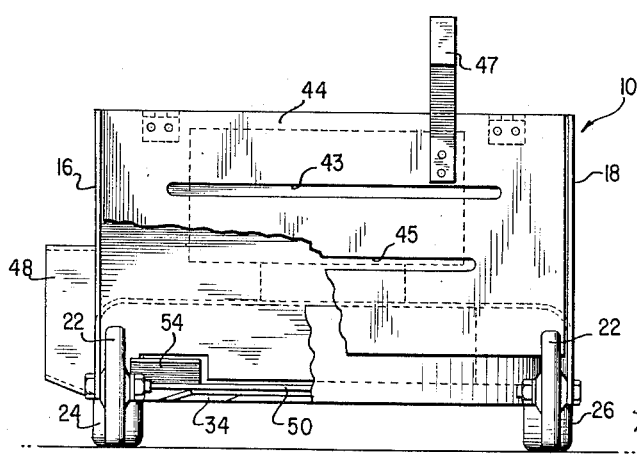
INVENTOR.
GERALD A. BENNETT
BY
Mead, Browne, Schuyler, & Beveridge
ATTORNEYS.

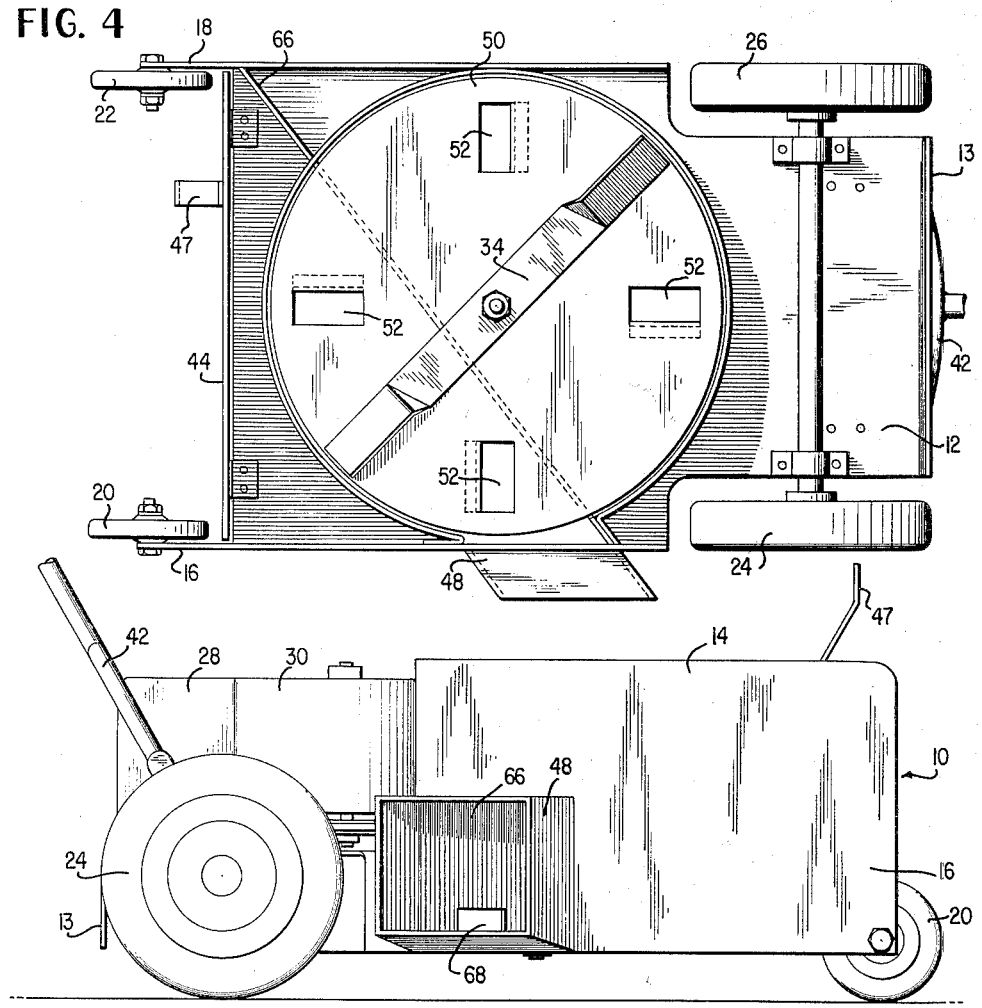
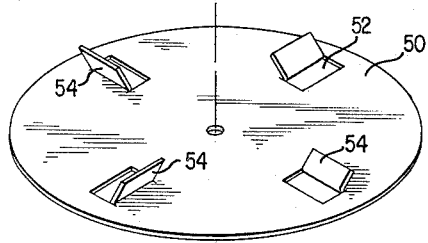
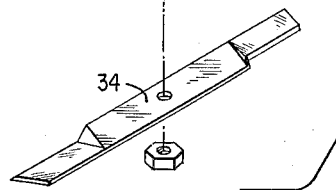
INVENTOR.
GERALD A. BENNETT

Sept. 10, 1963  G. A. BENNETT  3,103,077
SNOW REMOVER
Filed Nov. 3, 1961  3 Sheets-Sheet 3

INVENTOR.
GERALD A. BENNETT
BY
Mead, Browne, Schuyler, & Beveridge
ATTORNEYS.

United States Patent Office 3,103,077
Patented Sept. 10, 1963

3,103,077
SNOW REMOVER
Gerald A. Bennett, Washington Blvd., Oswego, N.Y.
Filed Nov. 3, 1961, Ser. No. 149,984
2 Claims. (Cl. 37—45)

This invention relates to a combination rotary lawn mower and snow remover.

Combination lawn mowers and snow removers are known, but most of them present special problems of adjustment and modification in order to convert the lawn mower into a snow remover and vice versa. In some instances, changes involve the tilting of the device so that the drive shaft is in a horizontal plane; for example, when converting to a snow remover. With other combination lawn mowers and snow removers, a separate fan has to be installed to replace the mower cutter blade, which entails considerable time to effect the change from mower to snow remover.

Accordingly, the primary object of this invention is to provide a combination rotary lawn mower and snow remover which is readily converted from a mower to a snow remover and vice versa.

A further object of the invention resides in the provision of a combination rotary lawn mower and snow remover which is supported by the same ground engaging wheels whether used as a lawn mower or as a snow remover without requiring adjustment of the wheels with respect to the rest of the apparatus.

A further object of this invention is to provide a rotary lawn mower which will not windrow the grass as it is discharged from the mower chute.

Further objects of this invention reside in the provision of a combination lawn mower and snow remover that is strong and durable, simple in manufacture and construction, highly efficient in operation, and which is relatively inexpensive to manufacture.

These and other objects of this invention will become more apparent from the description which follows and the accompanying drawings in which:

FIG. 1 is a top plan view of the apparatus comprising the present invention arranged for use as a rotary mower;

FIG. 2 is a vertical sectional view taken along the plane of line 2—2;

FIG. 3 is a front view with some parts broken away;

FIG. 4 is a bottom plan view of the apparatus of this invention arranged for use as a rotary mower;

FIG. 5 is a side view of the mower showing the chute;

FIG. 6 is a perspective exploded view of the rotary blade and impeller;

Figure 7:
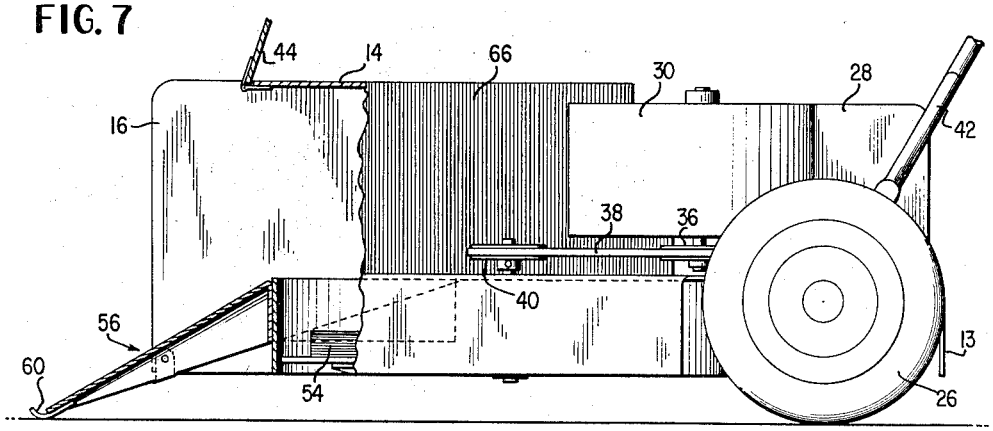
FIG. 7 is a side view, partly in section, of the apparatus comprising the present invention arranged for use as a snow remover.

With reference to the accompanying drawings wherein similar characters of reference designate similar or identical elements and portions throughout the specification and the different views in the drawings, and with particular attention to FIGS. 1 through 6, it will be noted that the combination lawn mower and snow remover, generally designated by reference numeral 10, is shown arranged for use as a lawn mower. The apparatus shown in the drawing includes a base, with a rear flange 13 on the base, mounted on housing 14. Secured to the base 12 by brackets 16 and 18 are front wheels 20 and 22, respectively. Journalled directly to the base 12 are rear wheels 24 and 26. Mounted on the base is the supporting structure 28 for the motor 30. Extending through base 12 is a shaft 32 with top and bottom bearings on which is mounted blade 34 which is driven by motor 30 through pulley 36, belt 38, and pulley 40. In addition, a handle 42 mounted on base 12 is provided for manually propelling the apparatus 10. A door or panel member 44 with louvers 43 and 45 is attached by hinges 46 to the top of housing 14. Door 44 is opened by lever 47 operated by linkage (not shown) connected to the operator's controls (not shown) mounted on the top of handle 42. The operator's controls include the usual clutching and throttling means associated with power mowers of this type. When the apparatus is employed as a mower, door 44 will be kept closed by locking the linkage connected to said door and also by wheels 16 and 18. In addition, as a further safety precaution, spring means (not shown) can be connected between door 44 and the casing 14 (FIG. 2), as will be evident to one skilled in the art, to insure that door 44 remains closed. Attached to the casing 14 as an integral part thereof is a chute 48 which provides for the discharge of grass cuttings or snow.

By referring to FIG. 6 the structure of the cutting mechanism will be apparent. This consists of a blade 34 on which is mounted disk 50 having openings 52 formed by cutting out portions of disk 50 and turning said portions outward to form flaps 54.

When the machine is used as a lawn mower, door 44 is closed (FIG. 3) and the rotary blade 34 driven at high speed by motor 30 will cut the grass which will be propelled out through chute 48 assisted by the fan effect of flaps 54 of disk 50 as it rotates with blade 34 on their common shaft 32.

Figure 8:
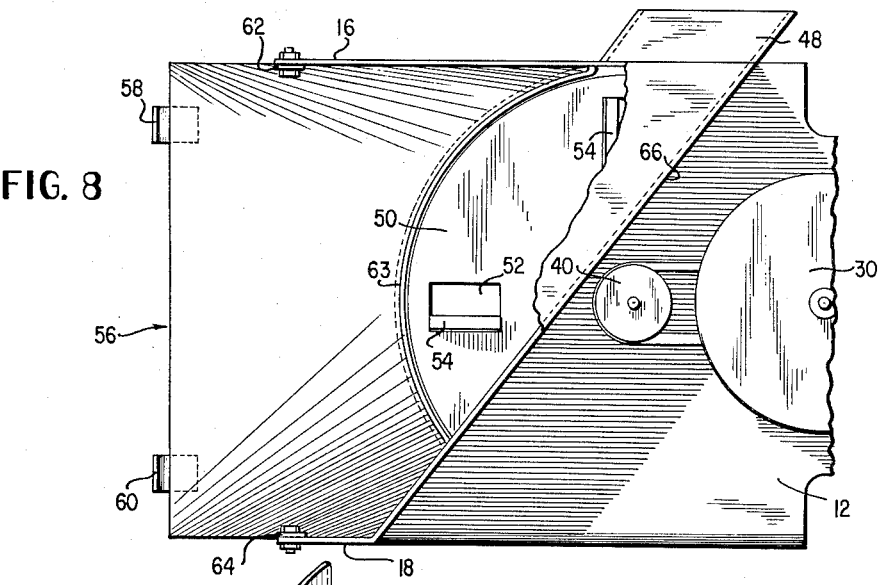
FIG. 8 is a top view, partly in section, of the apparatus comprising the present invention arranged for use as a snow remover.
Figure 9:
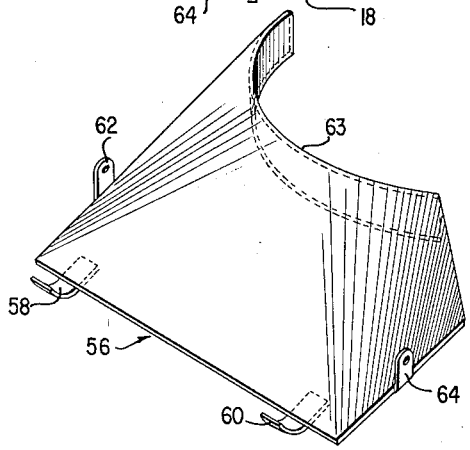
FIG. 9 is a perspective view of the removable element of the remover used to scoop or collect snow.

When the device is converted to a snow remover, the front wheels 20 and 22 are replaced by inclined front plate 56 (FIG. 9) which has runners 58 and 60 in addition to members 62 and 64 for attachment to brackets 16 and 18 where wheels 20 and 22 had previously been connected. It will be noted that the rear portion 63 of this plate is so shaped as to conform with the curvature of the rotor path. The assembled snow remover is shown in FIGS. 7 and 8.

When the apparatus is used as a snow remover, door 44 is opened and plate 56 is pushed into the snow which is forced up the inclined plate 56 and onto the disk 50 where the flaps 54 and blade 34 acting in the manner of a centrifugal fan or pump hurl the snow out through chute 48. A baffle 66 mounted diagonally above disk 50 and forming the rear wall of housing 14 directs the snow (or grass) out chute 48. It will be noted that the baffle 66 is continuous with the rear wall of chute 48. The baffle 66 has openings 68 therein to permit the free passage of rotating flaps 54.

It is to be understood that the design and arrangement of baffle, rotating disk with flaps, and the housing is critical to the efficient operation of the apparatus as a snow remover. Thus, the close clearance between openings 68 in baffle 66 and the flaps 54 of disk 50 minimize objectionable eddy currents which would lower the efficiency of the apparatus as a snow remover. Moreover, the arrangement of blade, disk, and associated flaps prevents the windrowing of the grass as it is expelled from the chute when the apparatus is used as a lawn mover.

Although a gas engine has been indicated in the present apparatus, it is apparent that other power means, such as an electric motor, can be employed. The power means should be such as to be capable of rotating the blades and disk at a minimum speed of about 2500 r.p.m.

Moreover, if the present apparatus is considered a right hand machine, a left hand machine is also contemplated by changing the angle of all component parts and reversing the direction of the shaft 32. In addition, the apparatus could be constructed without handle 42 and used as an attachment on tractors or other power equipment.

Further modifications of the disclosed mower and snow remover will be apparent to those familiar with and skilled in the art without departing from the spirit and scope of this invention as defined in the appended claims taken in conjunction with the description and drawings set forth.

From the foregoing description it will be apparent that there has been disclosed an apparatus which can be converted from a lawn mower to an effective snow remover with a minimum of effort and modification due to its simplified construction. In fact, in operation the snow remover has proven satisfactory in a fourteen inch snowfall.

Having described the invention, what I claim is:

1. A snow remover comprising a base mounted on front and rear supports, a power means mounted on said base, a rotatable shaft operatively connected to said power means and extending through said base, a disk having a periphery carried by said shaft, a plurality of flaps projecting from said disk but positioned within the periphery of said disk, a housing mounted on said base, a baffle constituting one wall of said base and having openings therein to permit the close entry and exit of the flaps thereto, said baffle extending diagonally across said base and disk, a panel member in the front of said housing to provide an opening for the entry of snow in said remover, and an inclined plate at the front of said remover to facilitate the entry of snow into the remover.

2. A snow remover comprising a base mounted on front runners and rear wheels, a power means mounted on said base, a rotatable shaft operatively connected to said power means and extending through said base, a disk having a periphery carried by said shaft, a plurality of flaps projecting from said disk but positioned within the periphery of said disk, a housing mounted on said base, a baffle constituting one wall of said base and having openings therein to permit the close entry and exit of the flaps thereto, said baffle extending diagonally across said base and disk, a panel member in the front of said housing to provide an opening for the entry of snow in said remover, and an inclined plate at the front of said remover to facilitate the entry of snow into the remover.

References Cited in the file of this patent

UNITED STATES PATENTS

| | | |
|---|---|---|
| 110,446 | Dougherty | Dec. 27, 1870 |
| 2,752,699 | Gustafson | July 3, 1956 |
| 2,791,078 | Kiekhaefer | May 7, 1957 |
| 2,983,057 | Erickson | May 9, 1961 |
| 2,990,666 | Blume | July 4, 1961 |
| 3,029,533 | Schwanke et al. | Apr. 17, 1962 |
| 3,035,359 | Ewert | May 22, 1962 |
| 3,043,036 | Trojanek | July 10, 1962 |